United States Patent [19]

Tadmor et al.

[11] Patent Number: 4,871,260
[45] Date of Patent: Oct. 3, 1989

[54] ROTARY PROCESSOR APPARATUS AND METHOD FOR EXTENSIVE AND DISPERSIVE MIXING

[76] Inventors: Zehev Tadmor, 641 Standish Rd., Teaneck, N.J. 07666; Arthur D. Siegel, 24 Goldenrod Ct., Cheshire, Conn. 06410; Jan-Chin Yang, 6 Millstone Ct., Pittsford, N.Y. 14534

[21] Appl. No.: 96,927

[22] Filed: Sep. 15, 1987

[51] Int. Cl.[4] .............................................. B01F 7/10
[52] U.S. Cl. ...................................... 366/99; 366/307; 366/315
[58] Field of Search ........................ 366/75, 76, 97–99, 366/302–307, 315, 262–265; 425/203, 374, 466; 159/9.1, 11, 11.1

[56] References Cited

U.S. PATENT DOCUMENTS

| | | | |
|---|---|---|---|
| 4,142,805 | 3/1979 | Tadmor | 366/97 |
| 4,194,841 | 3/1980 | Tadmor | 366/75 |
| 4,207,004 | 6/1980 | Hold et al. | 366/97 |
| 4,389,119 | 6/1983 | Valsamis et al. | 366/99 |
| 4,413,913 | 11/1983 | Hold et al. | 366/75 |
| 4,529,478 | 7/1985 | Mehta et al. | 159/9.1 |
| 4,549,810 | 10/1985 | Mehta | 366/75 |

OTHER PUBLICATIONS

Farrel Company, Bulletin #240, "Understanding the Farrel Diskpack® Compounder", 1986.

Primary Examiner—Timothy F. Simone

[57] ABSTRACT

A rotary processor for high-shear processing of plastic or polymeric materials comprises a rotor having end discs and at least one mixing disc therebetween, the rotor closely surrounded by a housing to defined annular processing chambers flanking each mixing disc, with a high-shear-mixing transfer gap defined between the mixing disc and the housing. Channel blocks are deployed at circumferentially spaced apart positions in adjacent chambers to cause transfer of material through the transfer gaps, with dispersive mixing occurring in the transfer gaps. Some embodiments have plural channel blocks in the chambers, evenly spaced apart. The channel blocks extend generally into and to the bottom of a chamber, and have two working surfaces divergent from a central region of the chamber and convergent toward the disc walls defining the chamber. The working surfaces and disc walls defined two high-shear-mixing recycle gaps through which a portion of the material passes and is mixed. The channel block configuration is also used in a single chamber rotary processor.

55 Claims, 4 Drawing Sheets

ROTARY PROCESSOR APPARATUS AND
METHOD FOR EXTENSIVE AND DISPERSIVE
MIXING

FIELD OF INVENTION

The invention herein relates to rotary processor apparatus and methods for extensive and dispersive mixing, with enhanced dispersive mixing capability being achieved in high-shear gaps defined by channel block configuration, mixing pin insert configuration and rotor configuration and by channel block deployment directing the material through the gaps.

BACKGROUND

The invention herein relates to rotary processors and methods of the general type described in U.S. Pat. Nos. 4,142,805 and 4,194,841. The disclosures of those U.S. Patents are expressly incorporated herein by reference.

The basic rotary processor comprises a rotor defining at least one annular processing channel and a surrounding stationary housing providing a coaxial surface cooperative with each rotor channel to form an enclosed annular processing chamber. The stationary housing has an inlet port to feed material to the annular processing chamber for processing of the material therein, and an outlet port spaced apart from the inlet port to discharge processed material. A stationary channel block member protrudes into the channel and provides a material collecting end wall surface. The channel block member is located in the annular processing chamber near the outlet thereof to obstruct or restrain movement of material within the chamber and to coact with the rotating channel walls to provide relative movement between the material and the channel wall surfaces as they rotate toward the outlet. This distinctive coaction causes melting of the material and permits liquid material in contact with the internal surfaces of the rotating channel to be dragged forward to the collecting channel block for controlled processing and/or discharge.

Many useful commercial embodiments of the basic rotary processor utilize a plurality of processing chambers. The channel of each chamber is defined between facing sidewalls extending inwardly from the rotor surface. The rotor is often comprised of a plurality of spaced-apart discs on a shaft to provide the multiple channels. The stationary housing has an internal cylindrical surface which cooperates with the rotor to close the channels and thereby define the plurality of enclosed annular processing chambers. A plurality of associated channel block members are deployed at a common circumferential position near the outlet of the rotary processor. In one rotary processor described in U.S. Pat. No. 4,389,119, the rotor parts separating the processing chambers are of a reduced diameter to permit material flow between chambers and resultant pressure equalization in the chambers.

In most instances, it has been desirable to provide effective sealing for the individual chambers of a multiple chamber processor in order to prevent unwanted leakage of material therefrom. The unwanted leakage for example can be external leakage from one or both of the end passages of a multiple chamber processor. Also, unwanted leakage can occur internally between adjacent individual annular processing chambers. The leakage of particular concern occurs at the clearance required between the peripheral or outer surface of rotor discs and the adjacent interior coaxial cylindrical surface of the stationary housing, particularly at those portions of the processing chambers where high pressures are generated. This problem has been addressed by providing various sealing means, for instance, those shown in U.S. Pat. No. 4,207,004.

It is also pertinent to an understanding of the invention herein that processing viscous or particulate plastic or polymeric materials often includes the introduction of additives such as carbon black and consequently requires good extensive and good dispersive mixing. Extensive or distributive mixing is characterized by circulation, separation and realigning of the material to achieve overall composition uniformity, or gross uniformity. Dispersive mixing is associated with the reduction in size of a segregated component which has a cohesive nature such as cohesive granular solids, liquid regions with surface tension, as well as vapor or gas bubbles. Dispersive mixing may be characterized as leading to agglomerate break-up, and is generally achieved by providing high shear stress regions, heretofore more readily achieved in blade-type mixing devices. Thus it is desirable to achieve both good extensive and good dispersive mixing in a rotary processor.

SUMMARY OF THE DISCLOSURE

A principal object of the invention herein is to enhanced the versatility of rotary processors.

An additional object of the invention herein is to provide rotary processors with combined extensive and dispersive mixing capability.

A further object of the invention is to improve the performance of rotary processors without increasing the complexity thereof.

A further aspect of the invention is the capability of providing good temperature control of the processed material by efficient removal of heat generated by viscous dissipation in the high stress clearances through temperature controlled hollow disc elements.

It is yet another object of the invention herein to achieve the foregoing objectives through internal configurations applied to the basic rotary processor structure.

Rotary processors according to the invention herein achieve good extensive and dispersive mixing of plastic, polymeric or other similar materials, including additives, such as carbon black. Rotary processors into which the invention is advantageously incorporated generally comprise a rotor having two coaxial end discs and at least one coaxial mixing disc positioned therebetween, said discs being mounted parallel and spaced apart on a central shaft and defining annular processing channels flanking each mixing disc. A stationary housing defines a coaxial cylindrical surface closely surrounding the outer peripheral surfaces of the rotor discs and thereby closes the annular processing channels to form annular processing chambers. Means are provided for rotating the rotor, including the end disc and one or more mixing discs, within the housing. Means are also provided for feeding plastic, polymeric or similar material into at least one of the annular processing chambers for processing and removing it thereafter. At least one channel block extends from the housing into each annular processing chamber, and the channel blocks of adjacent annular processing chambers are circumferentially spaced apart to direct the material into adjacent annular processing chambers as a part of processing. Further means are provided for establishing a sealing relationship between the housing and the end discs of the rotor.

According to the invention herein, the outer peripheral surface of at least one of the mixing discs and the adjacent cylindrical surface of the housing define a high-shear-mixing transfer gap between the annular processing chambers which flank the mixing disc. Plastic, polymeric or other suitable material and any desired additives are loaded into at least one of the annular processing chambers, and are carried forward by the rotor discs to accumulate at a channel block. The material is melted as a result of the heat and pressure generated in the annular processing chamber, and material in melted form is directed over the peripheral surface of the mixing disc through the high-shear-mixing transfer gap and into the next adjacent annular processing chamber. As the material passes through the transfer gap, it is subjected to high shear forces as a result of the material's tendency to adhere both to the moving outer peripheral surface of the mixing disc and to the stationary cylindrical surface of the housing. These high shear forces achieve dispersive and laminar mixing of the material and any additives thereto. Advantageously, the continuous transfer of material from one annular processing chamber to the next in of itself achieves extensive mixing of the material, as does circulation and agitation within each chamber. The channel blocks are deployed at circumferentially spaced apart locations to transfer the material between or among the annular processing chambers in a wide selection of flow patterns to achieve a selectable variety of extensive mixing patterns. Mixing employing the invention can be carried out by continuous or batch method, and inlet and discharge openings are positioned appropriately for the chosen method.

Also according to the invention herein, the edges of the peripheral mixing disc surfaces are rounded, to promote convergent flow patterns in the melt material approaching the high-shear-mixing transfer gap. Such convergent flow patterns increase the extensive and dispersive mixing ability of the rotary processor.

The invention herein also encompasses an improved channel block configuration which promotes convergent flow of the melted material and provides high shear mixing of melted material carried past the channel block to recycle in the same annular processing chamber. Thus, the invention herein also relates to improved channel block means for use in a rotary processor of the type comprising a rotor defining at least one annular processing channel, a housing closely surrounding the rotor to close the channel an thereby defining an annular processing chamber, means for driving the rotor and means for inputting and removing material with respect to the annular processing chamber, wherein the rotary processor includes a channel block extending from the housing generally radially into the annular processing chamber and to the bottom thereof, the channel block having two working surfaces joined at and divergent from the central region of the annular processing chamber and respectively convergent toward the facing surfaces of the rotor defining the annular processing chamber, said working surfaces together with the facing surfaces of the rotor respectively defining two high-shear-mixing recycle gaps flanking the channel block. Material collecting at the channel block is directed in convergent flow paths and a portion of the material passes continuously through the high-shear-mixing recycle gaps, the material being subjected to high shear dispersive, laminar mixing action as it passes through the recycle gaps.

The invention further encompasses utilizing the improved channel block configuration in multiple chamber rotary processors, including those utilizing the high-shear-mixing transfer gap according to the invention herein.

The invention further contemplates that more than one channel block can be used in the annular processing chamber such as a mixing insert to increase the high stress mixing recycling and to improve the extensive mixing by splitting and recombining of streams.

The invention also resides in a method of mixing material being processed in a rotary processor of the type comprising a rotor having at least two annular processing channels, a housing closely surrounding the rotor to close the channels and thereby define at least two annular processing chambers, means for driving the rotor, channel block means extending into the annular processing channels and means for inputting and removing material with respect to the rotary processor.

The method includes the steps of defining an elongated gap between two surfaces in a transfer path extending from one of the annular processing chambers to the other, preferably between the mixing disc and the cylindrical housing surface, and causing relative movement of the two surfaces defining the elongated gap, preferably by rotating the rotor. The material being processed, including additives thereto, is directed through the elongated gap in the transfer path, and the elongated gap between the two surfaces is dimensioned such that the movement of material therethrough and the relative movement of the two surfaces cause high shear dispersive mixing of the material and any additives thereto.

Other and more specific objects and features of the invention herein will in part be obvious and will in part appear to those skilled in the art from a consideration of the following description of the preferred embodiments and the claims, taken together with the drawings.

DRAWINGS

The same reference numerals refer to the same elements throughout the various Figures.

DESCRIPTION OF PREFERRED EMBODIMENTS

The preferred embodiments of rotary processors according to the invention herein shown in FIGS. 1–11 and described hereinafter are illustrative examples of means to achieve the objects of the invention herein, and particularly to achieve enhanced dispersive mixing, good extensive mixing and resultant versatility of application of the rotary processors through improved internal configurations. The improved internal configurations include the provision of high-shear-mixing transfer gaps between adjacent processing chambers in multiple chamber rotary processors and the deployment of channel blocks to direct material through the transfer gaps and further include the channel block configuration which defines high-shear-mixing recycle gaps. The channel block configuration is applicable to both single chamber and multiple chamber rotary processors.

Figure 1:
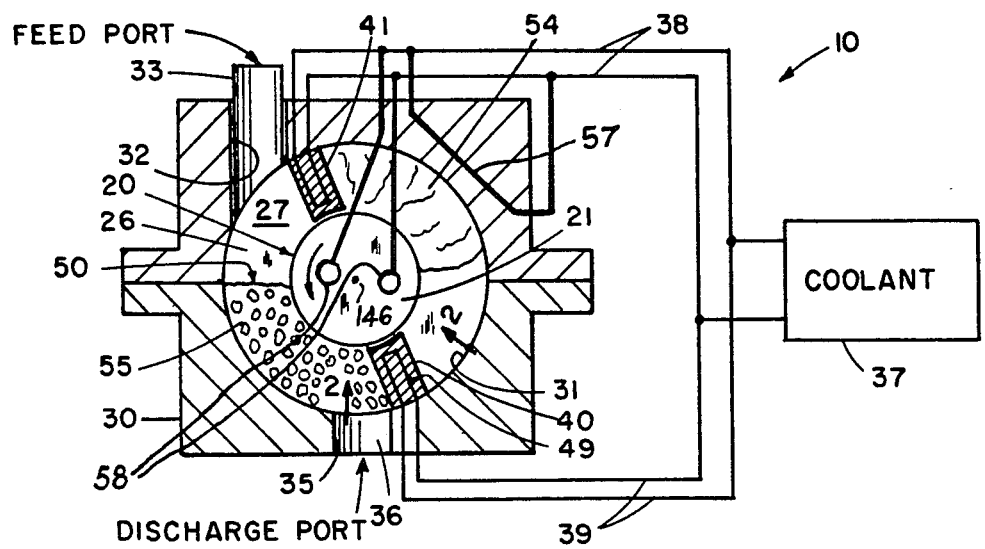
FIG. 1 is a sectional schematic view of a rotary processor according to the invention herein.
Figure 2:
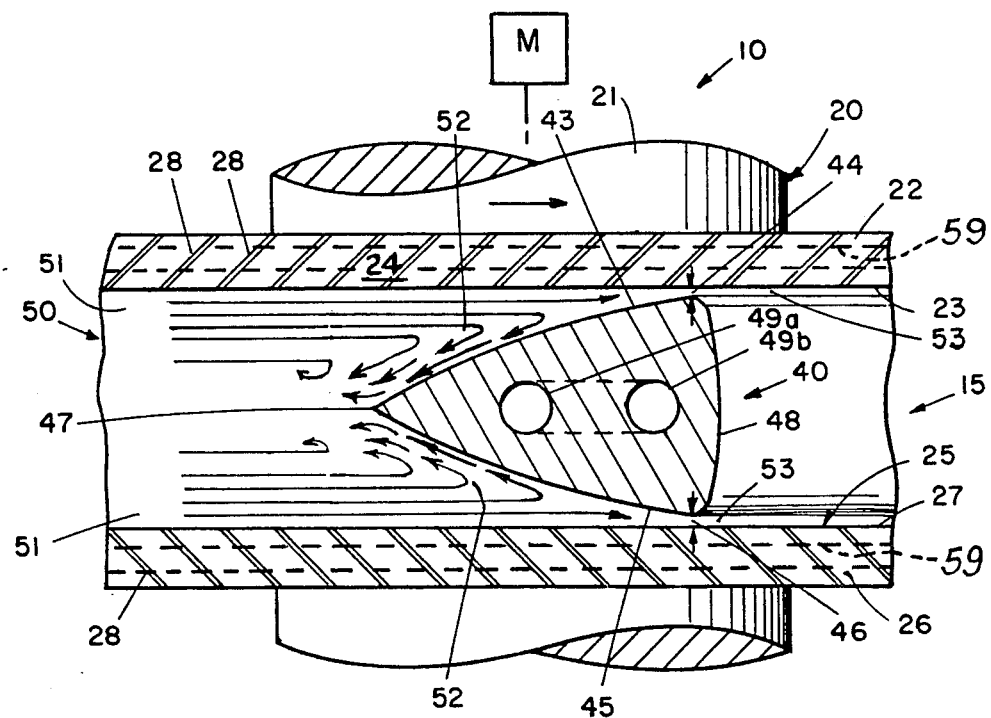
FIG. 2 is a partial sectional view, including the channel block, of the rotary processor of FIG. 1, taken along the lines 2—2 of FIG. 1.

The improved channel block configuration is utilized in a first rotary processor 10 according to the invention herein, which is illustrated schematically in FIGS. 1 and 2. The rotary processor 10 generally comprises a rotor 20 defining an annular processing channel 25, a housing 30 closely surrounding the rotor 20 to close the channel 25 and thereby form an annular processing chamber 15 and channel blocks 40 and 41. The rotary processor 10 further comprises motor means M for driving the rotor, the detail of which are well known in the art.

The rotor 20 includes a shaft 21 mounting at least two discs 22 and 26, the discs being parallel and spaced apart on the shaft 21. The facing interior surface 23 of disc 22, the facing interior surface 27 of disc 26 and the shaft together define the annular processing channel 25. The outer peripheral surfaces of the discs 22 and 26 are provided with sealing flights, e.g. sealing flights 28 on the peripheral surface 24 of disc 22.

It is to be understood that for continuous operation, the rotor 20 includes other discs (not shown) for defining other annular channels for providing other functions. For example, such other functions may include melting, pumping, devolitization, metering, and introduction of additives to the material being processed. Such other annular channels may be incorporated into the rotor prior to the annular processing channel 25, for example, for melting pellets of the material to be processed and, if desired, for performing one or more of the other functions explained above before the material is conveyed to and introduced into the annular processing channel 25. In order to clarify the illustration and explanation of the present invention such other discs, annular channels and their associated transfer passages have been omitted from the present drawings, as will be understood by those skilled in the art.

The housing 30 of the rotary processor 10 defines an interior cylindrical surface 31 which closely surrounds the outer peripheral surfaces of the rotor discs 22 and 26. The cylindrical surface "closes" the annular channel defined by the facing surfaces 23,27 of rotor discs 22,26 and the shaft to form the annular processing chamber 15. There are minimal clearances between the outer peripheral surfaces of the discs and the housing, but these clearances are minimized and sealed by the sealing flights 28 or other suitable means. The rotor 20 is mounted on bearing support means and is connected to a motor M for turning the rotor about its axis in the stationary housing. The housing 30 further defines a feed port 32 having a feed port block member 33 associated therewith, such that the block 33 may be removed and plastic, polymeric or other material to be processed together with any desired additives, may be introduced into the annular processing chamber 15 or into other annular channels in the rotor 20 which communicate with the chamber 15 through passages in the housing 30. The housing also defines a discharge port 35 having a discharge port block 36 associated therewith, such that the block 36 may be removed to discharge processed material from the annular processing chamber 15 or from other annular processing chambers in the rotor communicating through passages with the chamber 15.

The rotary processor 10 has channel blocks 40 and 41 deployed in the annular processing chamber 15. More particularly with respect to channel block 40, it is mounted to the housing 30 and extends radially inwardly through the annular processing chamber 15 to a distal end closely adjacent the shaft 21. The channel block 40 is mounted adjacent to and downstream from the discharge port 35 in the direction of rotor rotation. The channel block 41 is mounted adjacent and upstream of the feed port 32. The channel blocks 40 and 41 preferably have the same configuration, and channel block 40 will be described in detail.

As best seen in FIG. 2, channel block 40 has a generally isosceles triangular sectional configuration (or narrow V-shape with convex rounded sides) and is operatively characterized by sidewalls 43 and 45 which diverge from a forward edge or sharp nose 47 located in the central region of the annular processing chamber 15. The sidewalls 43,45 respectively converge with the facing surfaces 23 and 27 of the rotor discs 22 and 26. The channel block side walls 43, 45 are convex, with a large radius of curvature, such that they approach the rotor surfaces in an asymptotic or near-asymptotic relationship.

The sidewall 43 and the surface 23 of disc 22 together define a high-shear-mixing recycle gap 44. The other sidewall 45 and the side surface 27 of disc 26 also define a high-shear-mixing recycle gap 46 on the other side of the annular processing chamber 15. The back wall 48 of the channel block 40 is not actively involved in the processing of material.

Pressure and friction develop heat in the region of the channel block, and it is desirable to provide cooling. A coolant passage 49 is formed in the channel block 40, and in FIG. 2 the coolant passage is designated by the numerals 49a and 49b because the sectional view shows the feed and return portions of the same passage 49. As shown in FIG. 1, a source of coolant 37 communicates with the coolant passage 49 through lines 38 and 39 and with coolant passages 57 in the housing 30 and with coolant passages 58 in the rotatable shaft 21 which lead to coolant passages 59 (FIG. 2) in the discs 22 and 26.

A plastic or polymeric material is introduced to the annular processing chamber 15 of the rotary processor 10 through the feed port 32 (or through a feed port in the housing 30 from a housing passageway leading from another prior annular processing chamber) together with any additives to be mixed with the material, e.g. carbon black. The material may constitute a blend of various plastics or polymeric substances. The material and any additives are sometimes generally indicated at 50 throughout the various Figures; however, particular portions of the material are often designated by additional numerals for directing the reader's attention to particular regions in the various Figures. The material is generally loaded in dry, granular form, and the rotary processor 10 operated to melt the material and to dispersively and extensively mix it. Dispersive mixing, also sometimes known as intensive mixing, as explained above in the Background section, is directed toward breaking down non-uniform material, separating such material from itself and achieving initial dispersal of the material into the overall mix. The common additive, carbon black tends to agglomerate into clumps, and dispersive mixing is the high shear stress action necessary to break up agglomerated clumps into individual carbon black particles. Extensive mixing is that which achieves overall composition uniformity or "gross" uniformity of the mixture.

Solid material introduced into the annular mixing chamber 15 is dragged forward in the direction of rotation by rotation of the rotor and accumulates in front of the channel block 40 as indicated at 55 in FIG. 1. Friction and pressure increase the temperature of the material, causing it to melt, as is known in the art of rotary processors.

In FIG. 2, the material is shown at a relatively advanced stage of processing, when the material has substantially melted, with arrows depicting material movement. The melted material adheres to the discs and to adjacent portions of melted material, whereby the material is carried toward the channel block 40. The material 51 adjacent facing surfaces 23 and 27, and adhering thereto, has the greatest velocity, and this material is carried into the regions wherein the sidewalls 43, 45 of the channel block 40 and the facing disc surfaces 23, 27 respectively converge. Some of the material e.g. material designated at 52, is turned back into the advancing material, creating a swirl pattern convergent flow mixing action. The convergent flow swirl action and the continuous agitation contribute to good extensive mixing of the material, caused and intensified by the divergent sidewall configuration of the channel block 40.

Some of the material 53 is carried through the high-shear-mixing recycle gaps 44 and 46 (FIG. 2) between the moving disc wall surfaces and the stationary channel block 40, to which the material also adheres. The material is thus subjected to high shear stress in the gaps, characterized by strong elongational force components acting on the material to achieve dispersive mixing of the material. These forces act to break up and disperse any additives included in the material which is an integral part of the good dispersive mixing achieved by channel block configuration.

With reference to FIGS. 1 and 2, it will also be noted that the material flowing through the high-shear-mixing recycle gaps 44 and 46 is carried forward to accumulate at the next channel block 41, as indicated at 54, where it is further mixed. I then flows through the high-shear-mixing recycle gaps, flanking channel block 41, and rejoins the portion of material at 51. This "recycling" of the material in the same annular processing chamber also contributes to good extensive mixing.

Once adequate processing of the material has been achieved, the block 36 is removed from discharge port 35, and the accumulated material in front of channel block 40 is discharged. The discharge port may remain open until the material 54 has come around and exited, whereby the rotary processor 10 is in a batch mode, or new material can be added to be processed and mixed with material 54.

Figure 3:
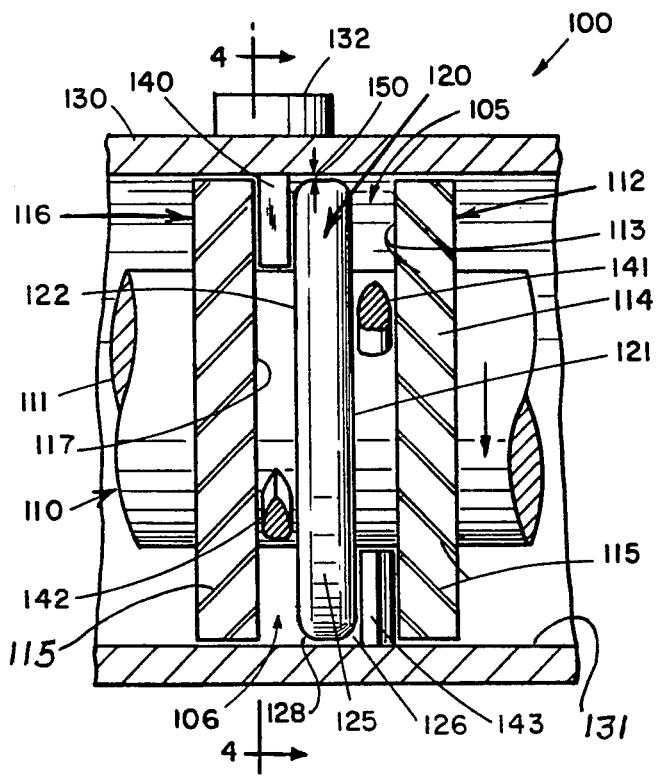
FIG. 3 is a schematic elevational view, partially cut away, of another rotary processor according to the invention herein.

Turning now to FIGS. 3–7 a multiple chamber rotary processor 100 and its operation according to the invention herein is illustrated. The rotary processor 100 generally comprises a rotor 110 having end discs 112 and 116, a central mixing disc 120 and a housing 130, whereby the rotor and housing together define two annular processing chambers 105 and 106 flanking the central mixing disc 120. The rotary processor 100 further comprises channel blocks 140 to 145 extending into the annular processing chambers 105 and 106, the channel blocks being deployed to cause a transfer of material from one chamber to the other, as more fully discussed below. In FIG. 3, the housing is cut away, as indicated by the section lines, but the discs and channel blocks are viewed in elevation.

Figure 6:
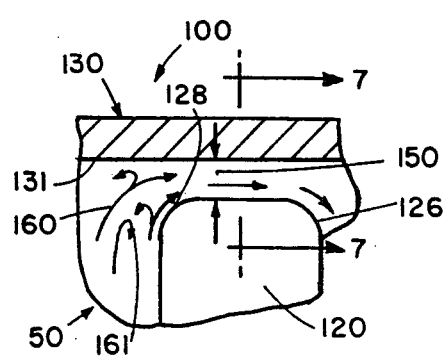
FIG. 6 is an enlarged fragmentary schematic view illustrating the convergent flow pattern of material approaching the high-shear-mixing transfer gap in the rotary processor of FIG. 3.
Figure 7:
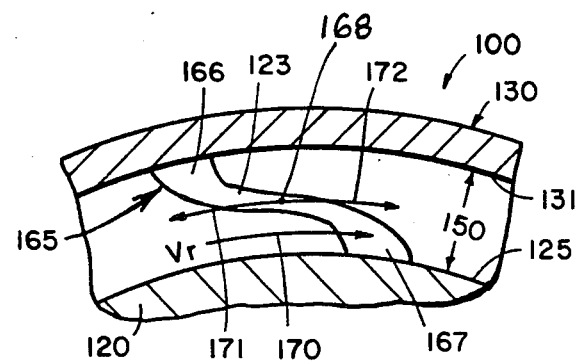
FIG. 7 is an enlarged fragmentary schematic sectional view illustrating the high-shear laminar mixing of an increment of material passing through the high-shear-mixing transfer gap in the rotary processor of FIG. 3 taken along the lines 7—7 of FIG. 6.
Figure 8:
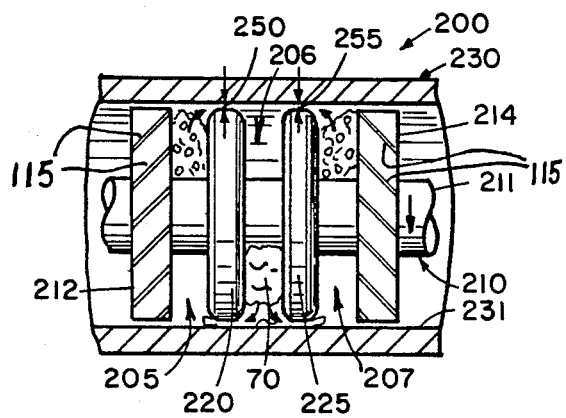
FIG. 8 is an elevational schematic view, partially in section and partially cut away, of another rotary processor according to the invention herein.
Figure 9:
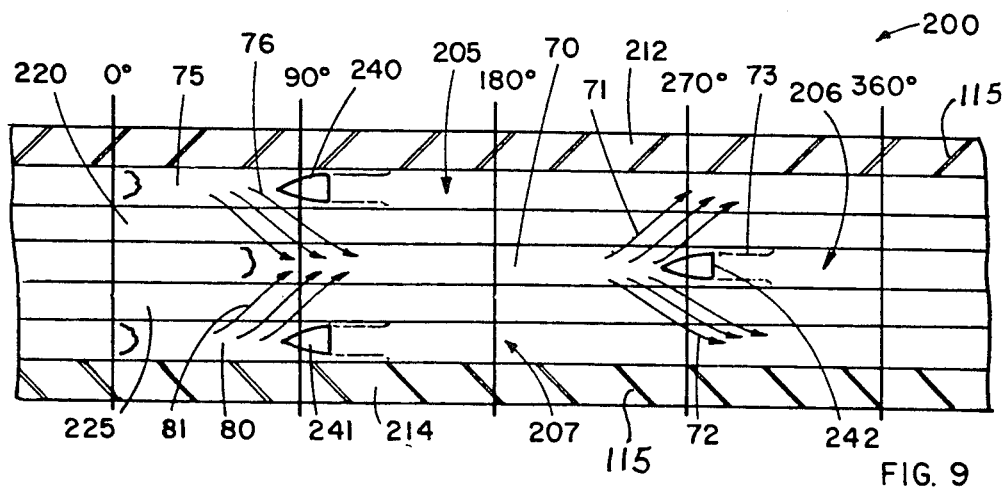
FIG. 9 is a schematic diagram showing the deployment of channel blocks in the rotary processor of FIG. 8, and the resultant flow of material between annular processing chambers therein.
Figure 11:
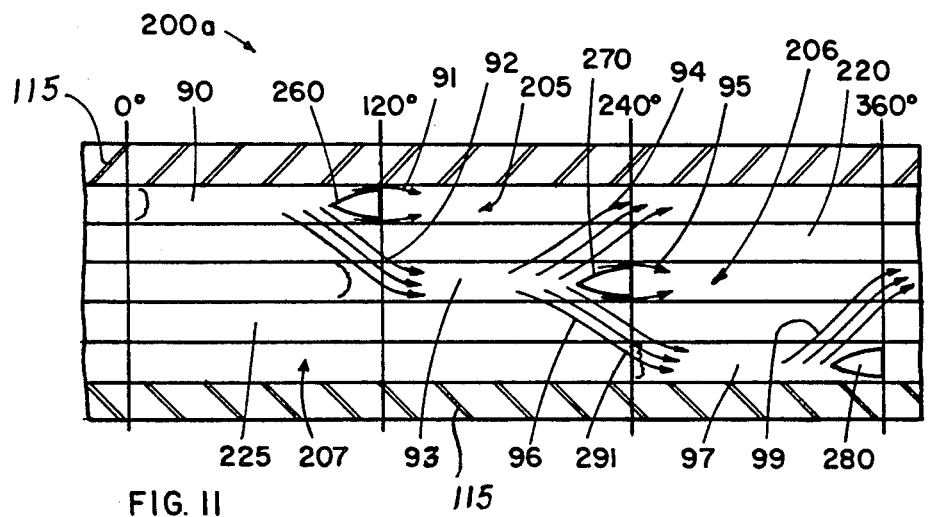
FIG. 11 is a schematic diagram showing of the deployment of channel blocks in another rotary processor, according to the invention herein, and the resultant flow of material between annular processing chambers.

It is to be understood with respect to FIGS. 3–7, and also with respect to FIGS. 8, 9 and 11, that temperature control liquid passages are provided in the various channel blocks and in the various discs and in the housing for circulating liquid for controlling the temperature of the various components as may be desired.

Inviting attention in more detail to FIGS. 3–7, it is seen that the rotor 110 comprises a shaft 111 having the end disc 112, the second end disc 116 and the central mixing disc 120 mounted thereon. The discs are parallel and spaced apart on the shaft. Disc 112 has an inside surface 113 and a peripheral surface 114, and the peripheral surface may be provided with sealing flights 115. The disc 116 is similar, having an inside surface 117 and suitable sealing means. The mixing disc 120 has a first side surface 121 facing the inside surface 113 of the end disc 112 and a second side surface 122, facing the inside surface 117 of end disc 116. The mixing disc 120 further includes a peripheral surface 125, and the transitions between the peripheral surface 125 and the outside surfaces 121 and 122 are preferably rounded, as indicated at 126 and 128. The rotor 110 thereby defines two annular processing channels flanking the central mixing disc 120.

The housing 130 of the rotary processor 100 defines an inside cylindrical surface 131 which closely receives the outside peripheral surfaces of the end discs 112 and 116. The cylindrical surface closes the annular processing channels defined by the rotor to complete the definition of the two annular processing chambers 105 and 106. It will be appreciated that the shaft 111 is mounted on suitable bearing means and is connected with a motor drive means to turn it within the housing 130.

The mixing disc 120 is of smaller diameter than the end discs 112 and 116. Thus, the peripheral surface 125 of the mixing disc 120 and the inside surface 131 of the housing 130 define between them a high-shear-mixing transfer gap 150, the operation of which is discussed in more detail below.

Figure 4:
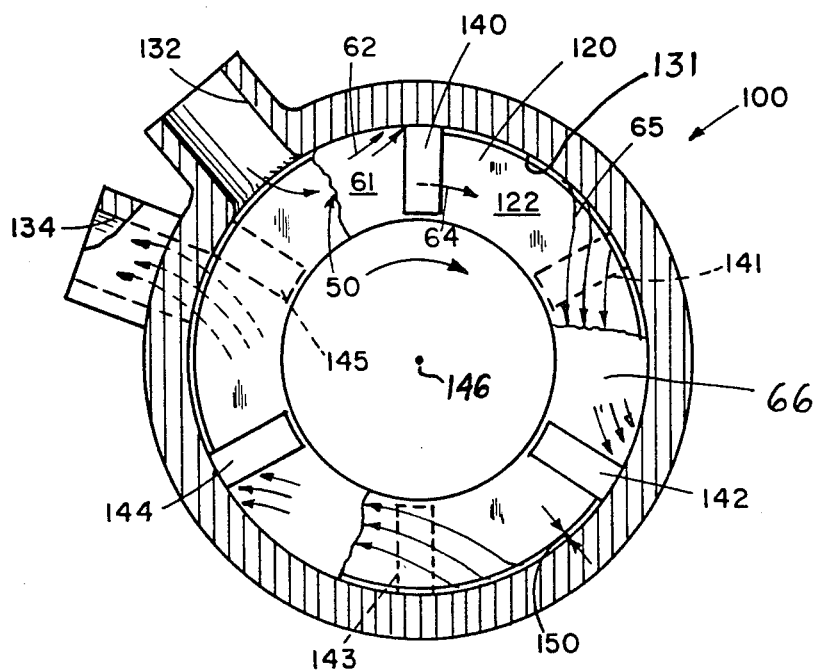
FIG. 4 is a sectional view of the rotary processor of FIG. 3, taken along the lines 4—4 of FIG. 3.
Figure 5:
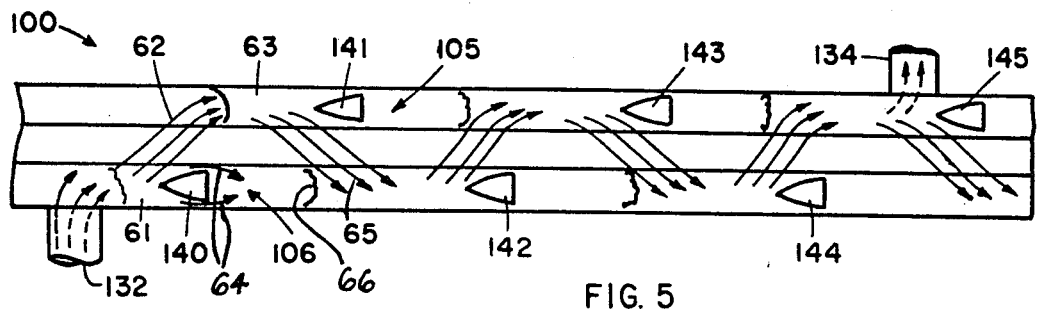
FIG. 5 is a schematic diagram illustrating the flow of material between annular processing chambers in the rotary processor of FIG. 3.

The housing mounts channel blocks 140–145, which extend into the annular processing chambers 105 and 106. The channel blocks 140–145 are circumferentially spaced apart about the annular processing chambers 105 and 106 with the channel blocks in the two channels "staggered" from each other as illustrated in FIGS. 3–5. The channel blocks 140–145 may take the configuration described above in rotary processor 10, i.e. having working surfaces which diverge from the central regions of the annular processing chambers, as shown, although prior art configurations of channel blocks may also be used. The housing 130 further defines a feed port 132 and a discharge port 134, each of which is provided with appropriate closure means. With particular reference to FIGS. 4 and 5, the first channel block 140 is downstream in the direction of rotor rotation from the feed port 132 in annular processing chamber 106. The next channel block 141 is located in annular processing chamber 105 approximately 60 degrees downstream from channel block 140. The next channel block 142 is located in annular processing chamber 106, approximately 120 degrees downstream from channel block 140, whereby channel 141 is approximately midway between channel blocks 140 and 142, but in the adjacent processing chamber. Channel blocks 143, 144 and 145 continue the alternating circumferentially spaced-apart deployment with channel block 145 located immediately downstream from the discharge port 134. The channel blocks 140–145 operate in a manner similar to that described above with respect to channel block 40; namely, they define high-shear-mixing recycle gaps at their sides within the annular processing chambers.

Plastic, polymeric or other material to be processed, including any desired additives, is loaded in the feed port 132 and accumulates in front of channel block 140, until the material melts and processing continues as described below. As above, the material is designated generally as 50 but particular increments or portions of the material are designated by additional numerals. The processing of material 50 in rotary processor 100 is illustrated in FIGS. 4–7. FIG. 4 has been discussed above, and FIG. 5 is a schematic diagramatic view of the periphery of the annular processing chambers depicted in plan format.

Viewing FIGS. 4 and 5 together, the material 61 has accumulated and melted in front of channel block 140 in annular processing chamber 106 and the pressure generated there continuously forces a portion of the material from annular processing chamber 106 through the high-shear-mixing transfer gap 150 (between the disc peripheral surface 125 (FIG. 3) and the inside surface 131 of the housing 130) to the annular processing chamber 105, as indicated by the arrows at 62. The material then accumulates at 63 in front of channel block 141 in annular processing chamber 105, and a portion of the material at 63 is continuously forced from annular processing chamber 105 back through the high-shear-mixing transfer gap 150 into annular processing chamber 106, as indicated by the arrows 65. A portion of the material also proceeds past channel block 140 in annular processing chamber 106 as indicated by the by-pass arrows 64. The portion of the by-pass material 64 depends upon the clearance between channel block 140 and the nearby disc surfaces 117 and 122 (FIG. 3) and also depends upon the rate of rotation of the rotor. This material collects at 66 in front of channel block 142.

With continued reference to FIGS. 4 and 5, the material 50 is directed back and forth between the annular processing chambers 105 and 106, through the high-shear-mixing transfer gap 150, at each of the remaining channel blocks 142–145. A portion of the material also passes through the high-shear-mixing recycle gaps at each channel block. With reference to FIG. 6, as the material approaches the high-shear-mixing transfer gap 150, as indicated by the arrows 160, it conforms to the rounded surface 128 of the mixing disc 120 which results in convergent flow patterns characterized by swirling and flow reversal, as particularly noted by the arrows at 161. It will be appreciated that the convergent flow pattern action, the continuous passing of portions of material through the recycle gaps and the continuous transfer of portions of material from one annular processing chamber to the other all contribute to good extensive mixing of the material and overall product uniformity.

The intensive dispersive mixing which occurs in the high-shear-mixing transfer gap is illustrated in FIG. 7. A portion of material 165 in the transfer gap 150 has a first increment 166 adhered to the inside surface 131 of the housing 130 and a second increment 167 adhered to the outer peripheral surface 125 of the central mixing disc 120. The increments 166 and 167 are initially radially aligned as the portion 165 enters the transfer gap, and the arrow 170 shows the relative velocity of the mixing disc 120 which causes separation of the increments 166 and 167. Another increment 168 positioned between increments 166, 167 is initially aligned with those increments but is elongated and thereby subjected to high shear action in the transfer gap 150 as the mixing disc rotates. The force components causing the elongation are depicted by arrows 171 and 172. It will be appreciated that all of the material passing through the high shear mixing transfer gap 150 is subjected to high-elongation, high-shear mixing action which accomplishes dispersive mixing of the material including any additives therein. The size of the transfer gap measured in the radial direction is selected with reference to the material to be processed and the type of processing desired; however, gaps having radial spacing in the range from about 15 mm to about 70 mm, and preferably about 50 mm are suitable for many materials.

Noting the extensive mixing described above, the material being processed in rotary processor 100 is thoroughly mixed in both extensive and dispersive manners, whereby the rotary processor 100 achieves versatility and is capable of a wide range of uses. It will be appreciated that material may circulate one or more than one revolution through the rotary processor, and the discharge port 134 may be opened at the appropriate time to remove the processed material, as shown in FIG. 5. Thus, the rotary processor 100 is adapted to operate in a continuous mode, but also may operate in a batch mode by leaving the discharge port open until all the material has exited the apparatus, or by providing additional discharge ports associated with other channel blocks.

FIG. 8 illustrates a three chamber rotary processor 200, which generally comprises a rotor 210 having a shaft 211, end discs 212, 214 and central mixing discs 220, 225. A housing 230 has an interior cylindrical surface 231 closely surrounding the rotor, and the rotor and housing together define three annular processing chambers 205, 206 and 207. The configuration of the end discs 212 and 214 may be similar to the discs 22 and 26 described above, and the central mixing discs may also be similar to the central mixing disc 120 described above, including the rounded disc edges to promote convergent flow patterns. A high shear mixing transfer gap is defined between each of the mixing discs and the housing, these transfer gaps being designated at 250 and 255. It will further be appreciated that means for driving the rotor around its axis and for inputting and removing material are provided as a part of the rotary processor 200 although not shown in the drawing for simplicity's sake. The rotary processor 200 also includes channel blocks, as more fully discussed below.

Figure 10:
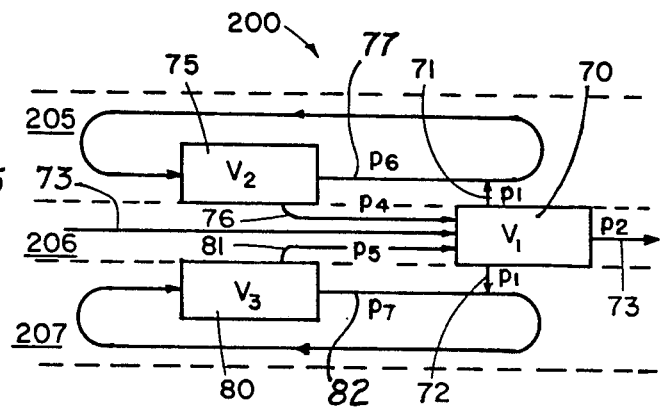
FIG. 10 is a schematic diagram showing the volumetric flow of material, including recycling, in the rotary processor of FIG. 8.

FIG. 9 is a schematic diagram illustrating the deployment of channel blocks in the three chamber rotary processor 200 of FIG. 8, and FIG. 10 shows diagramatically the movement of material caused by the deployment of channel blocks illustrated in FIG. 9. With reference to FIG. 9, a first pair of channel blocks 240 and 241 are deployed in annular processing chambers 205 and 207, respectively, at approximately 90 degrees about the circumference of the rotary processor from an arbitrary starting point. A third channel block 242 is deployed in the central annular processing chamber 206 at 270 degrees, i.e. circumferentially spaced 180 degrees downstream from the channel blocks 240,241.

Material to be processed is loaded into the annular processing chambers, and the input port may conveniently be positioned downstream of channel blocks 240,241. Material collects at the channel blocks, is melted, and flows in and between the annular processing chambers. More particularly, a first volume of material 70 accumulates in advance of channel block 242 and a portion of that material is continually directed through the high-shear-mixing transfer gaps 250,255 to annular processing chambers 205 and 207, as indicated by the arrows 71 and 72 to FIG. 9. Another portion 73 of material 70 continually passes through high-shear-mixing recycle gaps flanking channel block 242. This material is carried forward by the disc walls to rejoin the material 70.

This flow of material is also shown in FIG. 10, wherein the volume of material 70 in annular processing chamber 206 is also labeled "V1", portions p1 of the material are transferred to annular processing chambers 205 and 207, as indicated at 71 and 72, and a portion p2 of material recycles in chamber 206 as indicated at 73. The material in annular processing chamber 205 is also carried by the rotor until it joins material 75 in front of channel block 240, and this accumulation 75 of the volume of material is also labeled V2 in FIG. 10. A similar material accumulation 80 is found in front of channel block 241 in annular processing chamber 207 and is labelled V3 in FIG. 10. The channel blocks 240 and 241 direct portions p4 and p5 of the material back to the central annular processing chamber 206 as indicated by arrows 76 and 81. Portions p6 and p7 of the material also continuously recycle in chambers 205 and 207, as indicated at 77 and 82.

It will be appreciated that transfers back and forth across the central mixing discs 220 and 225 through the high-shear-mixing transfer gaps 250, 255 defined thereby, as well as passage through the high-shear-mixing recycle gaps flanking the channel blocks achieves the intensive, dispersive mixing desired, including particle break-up. The continuous transfer of material from chamber to chamber and the convergent flow patterns that attends the transfers provide good extensive mixing for product uniformity. At least one discharge port, not shown, for example communicating with the middle chamber 206, is provided to remove the processed material from the rotary mixer 200.

FIG. 11 illustrates the deployment of channel blocks in another three chamber rotary processor 200a, which is otherwise similar to that generally described above and shown in FIG. 8. The rotor housing and chambers bear the same reference numbers as those designating elements of rotary processor 200. With reference to FIG. 11 a first channel block 260 is deployed at the 120 degree position from an arbitrary starting point in annular processing chamber 205, a second channel block 270 is deployed at 240 degrees in central annular processing chamber 206 and a third channel block 280 is positioned in annular processing chamber 207 positioned at 360 degrees. Thus the channel blocks 260,270 and 280 are evenly circumferentially spaced about the periphery of the annular processing chambers.

Figure 12:
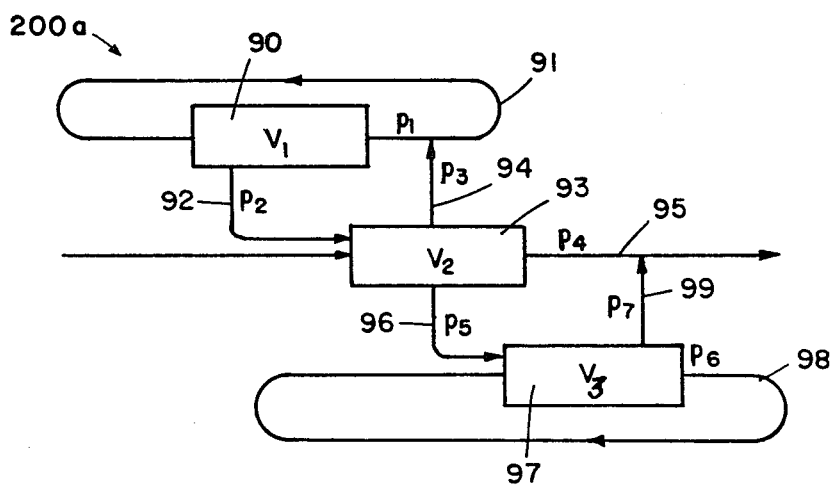
FIG. 12 is a schematic diagram showing the volumetric flow of material in the rotary processor FIG. 11.

Plastic, polymeric or other material to be processed, including any desired additives, is loaded into the central annular processing chamber 205 substantially upstream from the channel block 260 and the material accumulates at 90 (V1 in FIG. 12) in advance of channel block 260. As the rotor turns, the heat developed by friction and pressure melt the material 90. Portion p1 thereof (91 in FIG. 12) passes through the high-shear-mixing recycle gaps flanking channel block 260 and comes around to rejoin material 90 in chamber 205. Another portion p2 (92 in FIG. 12) is directed through the high-shear-mixing transfer gap defined between mixing disc 220 and the housing to form volume V2 of material at 93 in advance of transfer block 270 in the central annular processing chamber 206. The material there is continuously divided into three portions: portion p3 is directed back to annular processing chamber 205, as shown at 94; portion p4 passes transfer block 270 to recycle in annular processing chamber 206, as shown at 95; and portion p5 is transferred to annular processing chamber 207 as shown at 96. A volume V3 of material, indicated at 97, accumulates in advance of channel block 280 in chamber 207. A portion p6 indicated at 98 continuously recycles in chamber 207 and another portion p7 indicated at 99 continuously transfers back to annular processing chamber 206. All of the transfers are through high-shear-mixing gaps to provide good intensive mixing of the material, and the deployment of transfer blocks 260, 270, and 280 results in good extensive mixing of the material. The input and discharge ports may be positioned for batch or continuous processing, as desired.

The foregoing embodiments admirably achieve the objects of the invention herein but are illustrative only. Those skilled in the art may make adaptions and modifications without departing from the spirit nd scope of the invention, which is limited only by the following claims and equivalents of the claimed elements.

We claim:
1. A rotary processor for high-shear processing of plastic or polymeric materials and additives thereto, the rotary processor comprising:
(A) a rotor having two coaxial end discs and at least one coaxial mixing disc positioned therebetween, said discs being mounted parallel and spaced apart on a central shaft thereby defining annular processing channels flanking each mixing disc;
(B) a housing defining a surface closely surrounding the outer peripheral surfaces of the rotor and closing the annular processing channels to form annular processing chambers;

(C) means for rotating the rotor within the housing;
(D) means for inputting and removing materials from the annular processing chambers;
(E) at least one channel block means extending from the housing into each annular processing chamber, the channel block means of adjacent annular processing chambers being circumferentially spaced apart;
(F) means establishing a sealing relationship between the housing and said end discs of the rotor; an
(G) the outer peripheral surface of at least one mixing disc and the surrounding surface of the housing defining a high-shear-mixing transfer gap between the annular processing chambers flanking that mixing disc, whereby a portion of the material collected near the channel block means is directed through the high-shear-mixing transfer gap as a part of extensive mixing of the material and the material is dispersively mixed during transfer.

2. A rotary processor as defined in claim 1 wherein the mixing disc has a peripheral surface and side surfaces and a transitional surface between the side surfaces and the peripheral surface is rounded, whereby material approaching the high-shear-mixing transfer gap defined by the outer peripheral surface of the mixing disc and the surrounding surface of the housing develops convergent flow patterns as it passes over said rounded transitional surface, thereby enhancing mixing of the material.

3. A rotary processor as defined in claim 1 wherein the channel block means and the rotor discs flanking the channel block means define respectively two high-shear-mixing recycle gaps through which a portion of the material being processed continuously passes.

4. A rotary processor as defined in claim 3 wherein the channel block means comprises a channel block extending from the housing generally radially into and to the bottom of the annular processing chamber and the channel block has two working surfaces joined at and divergent from the central region of the annular processing chamber and respectively convergent toward the facing surfaces of the rotor discs defining the annular processing chamber, the two high-shear-mixing recycle gaps being defined at the closest point of separation between the channel block surfaces and rotor disc surfaces.

5. A rotary processor as defined in claim 4 wherein the mixing disc has a peripheral surface and side surfaces and a transitional surface between the side surfaces and the peripheral surface is rounded, whereby material approaching the high-shear-mixing transfer gap defined by the outer peripheral surface of the mixing disc and the surrounding surface of the housing develops convergent flow patterns as it passes over said rounded transitional surface, thereby enhancing mixing of the material.

6. A rotary processor as defined in claim 1 wherein the at least one mixing disc comprises one mixing disc defining two annular processing chambers flanking said one mixing disc, and the channel block means comprises one channel block deployed in each annular processing chamber.

7. A rotary processor as defined in claim 6 wherein the two channel blocks are deployed at an angular separation of at least 60° about the circumference of the annular processing chambers.

8. A rotary processor as defined in claim 1 wherein the at least one mixing disc comprises one mixing disc defining two annular processing chambers flanking said one mixing disc, and the channel block means comprises a plurality of channel blocks in each annular processing chamber.

9. A rotary processor as defined in claim 8 wherein the plurality of channel blocks in each of the annular processing chambers are evenly spaced about the periphery of the respective annular processing chamber, and the channel blocks in each respective annular processing chamber are angularly separated from the channel blocks in the other respective annular processing chamber.

10. A rotary processor as defined in claim 4 wherein the mixing disc has a peripheral surface and side surfaces and a transitional surface between the side surfaces and the peripheral surface is rounded, whereby material approaching the high-shear-mixing transfer gap defined by the outer peripheral surface of the mixing disc and the surrounding surface of the housing develops convergent flow patterns as it passes over said rounded transitional surface, thereby enhancing mixing of the material.

11. A rotary processor as defined in claim 4 wherein the channel block means and the rotor discs flanking the channel block means define respectively two high-shear-mixing recycle gaps through which a portion of the material being processed continuously passes.

12. A rotary processor as defined in claim 11 wherein the channel block means comprises a channel block extending from the housing generally radially into and to the bottom of the annular processing chamber and the channel block has two working surfaces joined at and divergent from the central region of the annular processing chamber and respectively convergent toward the facing surfaces of the rotor discs defining the annular processing chamber, the two high-shear-mixing recycle gaps being defined at the closest point of separation between the channel block surfaces and rotor disc surfaces.

13. A rotary processor as defined in claim 12 wherein the mixing disc has a peripheral surface and side surfaces and a transitional surface between the side surfaces and the peripheral surface is rounded, whereby material approaching the high-shear-mixing transfer gap defined by the outer peripheral surface of the mixing disc and the surrounding surface of the housing develops convergent flow patterns as it passes over the rounded transitional surface, thereby enhancing mixing of the material.

14. A rotary processor as defined in claim 9 wherein the plurality of channel blocks comprises three channel blocks in each annular processing chamber.

15. A rotary processor as defined in claim 8 wherein the means for inputting and removing materials from the annular processing chambers comprises an inlet port communicating with one of the annular processing chambers and a discharge port communicating with the other of the annular processing chambers.

16. A rotary processor as defined in claim 1 wherein temperature control liquid circulating means circulates temperature-controlling liquid within the channel block means and the discs and the housing for controlling their temperature.

17. A rotary processor as defined in claim 1 wherein the at least one mixing disc comprises two mixing discs defining three annular processing chambers, comprising a central annular processing chamber and a first outside annular processing chamber located in a first axial direction from said central annular processing chamber and a second annular processing chamber located in a second axial direction from said central annular processing chamber.

18. A rotary processor as defined in claim 17 wherein the channel block means comprises a first channel block in said first outside annular processing chamber, a second channel block deployed at the same circumferential position in said second outside annular processing chamber, a third channel block in said central annular processing chamber, and said third channel block is circumferentially spaced apart from said first and second channel blocks.

19. A rotary processor as defined in claim 18 wherein said third channel block in said central annular processing chamber is circumferentially spaced 180 degrees from said first and second channel blocks.

20. A rotary processor as defined in claim 20 wherein the channel block means comprise a plurality of channel blocks in each of said three annular processing chambers 21. A rotary processor as defined in claim 18 wherein the channel blocks in said respective annular processing chambers are each slightly spaced from surfaces of discs flanking the respective channel blocks for defining two high-shear-mixing recycle gaps through which a portion of the material being processed continually passes.

22. A rotary processor as defined in claim 17 wherein the channel blocks in adjacent annular processing chambers are evenly circumferentially spaced apart.

23. A rotary processor as defined in claim 1 wherein the at least one mixing disc comprises a plurality of mixing discs defining multiple annular processing chambers, and the channel block means in adjacent channels are evenly spaced apart.

24. A rotary processor as defined in claim 23 wherein the channel block means comprise multiple channel blocks in each annular processing chamber.

25. A rotary processor as defined in claim 23 wherein each mixing disc has a peripheral surface and side surfaces and a transitional surface between the side surfaces and the peripheral surface is rounded, whereby material approaching the high-shear-mixing transfer gap defined by the outer peripheral surface of each mixing disc and the surrounding surface of the housing develops convergent flow patterns as it passes over said rounded transitional surface, thereby enhancing mixing of the material.

26. A rotary processor as defined in claim 23 wherein the channel block means and the rotor discs flanking the channel block means define respectively two high-shear-mixing recycle gaps through which a portion of the material being processed continuously passes.

27. A rotary processor as defined in claim 26 wherein the channel block means comprises a channel block extending from the housing generally radially into and to the bottom of the annular processing chamber and the channel block has two working surfaces joined at and divergent from the central region of the annular processing chamber and respectively convergent toward the facing surfaces of the rotor discs defining the annular processing chamber, the two high-shear-mixing recycle gaps being defined at the closest point of separation between the channel block surfaces and rotor disc surfaces.

28. A rotary processor as defined in claim 27 wherein the mixing disc has a peripheral surface and side surfaces and a transitional surface between the side surfaces and the peripheral surface is rounded, whereby material approaching the high-shear-mixing transfer gap defined by the outer peripheral surface of the mixing disc and the surrounding surface of the housing develops convergent flow patterns as it passes over said rounded transitional surface, thereby enhancing mixing of the material.

29. A rotary processor as defined in claim 27 wherein the channel block means comprise multiple channel blocks in each annular processing chamber.

30. Improved channel block means for use in a rotary processor of the type comprising a rotor having an axis and having at least one annular processing channel, a housing closely surrounding the rotor to close the channel and thereby define an annular processing chamber, means for rotationally driving the rotor around its axis, channel block means extending into the annular processing channel and means for inputting and discharging material with respect to the annular processing chamber, said improved channel block means comprising:
 (A) a channel block extending from the housing generally radially into and to the bottom of the annular processing chamber;
 (B) said channel block having two working surfaces joined at and divergent from a sharp leading nose and respectively convergent toward facing surfaces of the rotor defining the annular processing chamber; and
 (C) said working surfaces together with said facing surfaces of the rotor respectively defining two high-shear-mixing recycle gaps flanking the channel block; whereby material carried toward the channel block by the rotor is directed in convergent flow paths by said nose and working surfaces of said channel block, and at least some material is subjected to high shear dispersive mixing in passing through said recycle gaps.

31. Improved channel block means as defined in claim 30 wherein said two working surfaces of the channel block diverge from said nose positioned in a central region of the annular processing chamber.

32. Improved channel block means as defined in claim 31 wherein said divergent working surfaces of the channel block are convex.

33. Improved channel block means as defined in claim 32 wherein said two working surfaces of the channel block respectively substantially asymptotically converge toward said facing surfaces of the rotor defining the annular processing chamber.

34. Improved channel block means as defined in claim 31 wherein the channel block has a generally isosceles triangular cross-sectional configuration, and said two working surfaces are rounded convex as seen in said cross-sectional configuration.

35. Improved channel block means as defined in claim 34 wherein the channel block defines at least one coolant passage for conducting a flow of coolant therethrough.

36. Improved channel block means as defined in claim 30 wherein the divergent working surfaces of the channel block are convex.

37. Improved channel block means as defined in claim 30 wherein the two working surfaces of the channel block respectively substantially asymptotically converge toward the facing surfaces of the rotor defining the annular processing chamber.

38. Improved channel block means as defined in claim 30 wherein the channel block has a substantially isosceles triangular cross-sectional configuration.

39. Improved channel block means as defined in claim 30 wherein the channel block defines at least one coolant passage for conducting a flow of coolant therethrough.

40. A method of mixing material being processed in a rotary processor of the type comprising a rotor having at least two annular processing channels, a housing closely surrounding the rotor to close the channels and thereby define at least two annular processing chambers, means for rotationally driving the rotor around its axis, channel block means extending into the annular processing channels and means for inputting and discharging material with respect to the rotary processor, the method comprising:
(A) defining an elongated gap between two surfaces in a transfer path extending from one of the annular processing chambers to the other;
(B) causing relative movement of the two surfaces defining the elongated gap;
(C) directing material being processed, including additives thereto, through the elongated gap in the transfer path; and
(D) dimensioning the elongated gap between the two relatively moving surfaces such that the movement of material therethrough and the relative movement of the two surfaces cause high-shear dispersive mixing of the material and any additives thereto.

41. A method of mixing material as defined in claim 40 wherein a portion of the material being processed is continuously transferred through the elongated gap in the transfer path.

42. A method of mixing material as defined in claim 40 wherein the relative movement caused between the two surfaces defining the elongated gap is substantially transverse to the flow of material through the elongated gap.

43. A method of mixing material as defined in claim 40 wherein said housing is stationary, and the elongated gap is a transfer gap defined between a peripheral surface of the rotating rotor separating the annular processing chambers and an inner surface of said stationary housing closely surrounding the rotor.

44. A method of mixing material as defined in claim 43 wherein a portion of the material being processed is continuously transferred through the elongated gap in the transfer path.

45. A method of mixing material as defined in claim 43 wherein the material is directed successively from one adjacent annular processing chamber to another passing successively in opposite directions through the transfer gap by positioning channel blocks at circumferentially spaced apart positions in adjacent annular processing chambers.

46. A method of mixing material as defined in claim 43 wherein there are two adjacent annular processing chambers and the transfer gap extends substantially around the adjacent circumferences of the annular processing chambers, and the material is directed back and forth between the adjacent annular processing chambers through the gap.

47. A method of mixing material as defined in claim 43 wherein there are two annular processing chambers and the transfer gap extends substantially around the circumference of the annular processing chambers and the material is directed back and forth between the annular processing chambers through the gap.

48. A method of mixing material as defined in claim 47 wherein said rotor has pairs of axially spaced opposed sidewall surfaces, and each pair of said sidewall surfaces flanks a respective one of said annular processing chambers, including the step of providing significant clearance gaps between a channel block and the sidewall surfaces flanking the annular processing chamber in which the channel block is positioned for causing a portion of the material to pass continuously through said clearance gaps for experiencing high-shear-mixing while passing through said gaps.

49. A method of mixing material as defined in claim 43 wherein there are multiple annular processing chambers and the transfer gap extends substantially around the circumference of the annular processing chambers and the material is directed among the annular processing chambers through the gap.

50. A method of mixing material in a rotary processor of the type comprising a rotor and a housing together defining at least two annular processing chambers, the rotor including a mixing disc between each adjacent pair of processing chambers, the mixing disc and the housing defining circumferentially extending gap through which material being processed may pass, the method comprising transferring a portion of material from a first one of the annular processing chambers to an adjacent second annular processing chamber through a first region of the gap and thereafter transferring at least a portion of the transferred material back from said second annular processing chamber to said first annular processing chamber through a second region of the gap circumferentially spaced apart from said first region.

51. A method of mixing material as defined in claim 50 wherein a transfer of material back and forth between chambers is continuously occurring during processing.

52. A method of mixing material as defined in claim 50 and further comprising continually accumulating material in each annular processing chamber near the regions of transfers of material from annular processing chambers, and recycling a portion of the accumulated material in the same annular processing chamber.

53. A method of mixing material as defined in claim 50 wherein the transfers between adjacent annular processing chambers are performed at evenly spaced apart regions about the circumference of the annular processing chambers.

54. A method of mixing material as defined in claim 50 including transferring material back and forth between adjacent annular processing chambers at a plurality of circumferentially spaced apart regions of the gap.

55. A method of mixing material as defined in claim 54 wherein the transfers between adjacent annular processing chambers are performed at evenly spaced apart positions about the circumference of the annular processing chambers.

* * * * *

UNITED STATES PATENT AND TRADEMARK OFFICE
CERTIFICATE OF CORRECTION

PATENT NO. : 4,871,260
DATED     : October 3, 1989
INVENTOR(S) : Zehev Tadmor et al.

It is certified that error appears in the above-identified patent and that said Letters Patent is hereby corrected as shown below:

On the covering page of the patent after item [76] Inventors: and before item [21] Appl. No.: the following item should appear:

[73] Assignee: Farrel Corporation, Ansonia, CT

Signed and Sealed this

First Day of January, 1991

Attest:

HARRY F. MANBECK, JR.

*Attesting Officer*        *Commissioner of Patents and Trademarks*